United States Patent [19]

Tanabe et al.

[11] Patent Number: 4,722,863

[45] Date of Patent: Feb. 2, 1988

[54] MAGNETIC RECORDING MEDIUM

[75] Inventors: Toshihiko Tanabe, Osaka; Jozo Shimizu; Kozaburo Sato, both of Kyoto, all of Japan

[73] Assignee: Hitachi Maxell, Ltd., Osaka, Japan

[21] Appl. No.: 719,807

[22] Filed: Apr. 4, 1985

[30] Foreign Application Priority Data

Apr. 4, 1984 [JP] Japan .................................. 59-68188
Jun. 9, 1984 [JP] Japan ................................ 59-118783

[51] Int. Cl.$^4$ ...................... G11B 5/708; G11B 5/712
[52] U.S. Cl. .................................. 428/329; 252/62.54; 427/128; 428/403; 428/522; 428/425.9; 428/532; 428/694; 428/695; 428/900
[58] Field of Search ............ 428/694, 695, 900, 425.9, 428/328, 329, 532, 403; 427/128, 131; 252/62.54; 360/134-136

[56] References Cited

U.S. PATENT DOCUMENTS

| | | | |
|---|---|---|---|
| 4,135,016 | 1/1979 | Ogawa | 428/900 |
| 4,315,057 | 2/1982 | Horigome | 428/694 |
| 4,337,288 | 6/1982 | Takenaka | 427/128 |
| 4,503,120 | 3/1985 | Yamauchi | 428/694 |
| 4,522,885 | 6/1985 | Funahashi | 428/694 |
| 4,560,616 | 12/1985 | Okita | 428/694 |

*Primary Examiner*—Ellis P. Robinson
*Attorney, Agent, or Firm*—Birch, Stewart, Kolasch & Birch

[57] ABSTRACT

A magnetic recording medium comprising a substrate and a magnetic layer coated thereon, the magnetic layer containing magnetic powder, a resinous binding agent and at least one sorbic acid compound selected from the group consisting of sorbic acid and derivatives and metal salts thereof, such that the magnetic powder is well dispersed in the magnetic layer and which has improved electrical properties.

13 Claims, No Drawings

MAGNETIC RECORDING MEDIUM

BACKGROUND OF THE INVENTION

1. Field of the Invention

The present invention relates to a magnetic recording medium. More particularly, it relates to a magnetic recording medium with good dispersibility of fine magnetic powder in a binding agent and improved electrical properties.

2. Related Art

Generally, a magnetic recording medium comprises a substrate film and a magnetic layer coated thereon by applying a mixture containing magnetic powder, a binding agent, an organic solvent and other suitable components followed by drying.

A recently used magnetic recording medium such as a video tape is required to have improved playback output and S/N ratio so as to create a sharp picture and/or clear sound in order to accommodate a video tape recorder which seeks highly densified recording. To this end, the particle size of the fine magnetic powder to be contained in the magnetic layer is increasingly reduced to provide a specific surface area of 30 m²/g or larger measured by the BET method.

Since the surface of such fine magnetic powder is hydrophilic, it is difficult to disperse the magnetic powder in a lipophilic binding agent. In addition, the magnetic powder tends to coagulate and adsorb more liquid as its particle size becomes smaller, which results in an increase of viscosity of the mixture so that sufficient shear is not effectively applied to the mixture in the dispersing equipment. Therefore, the dispersability of the magnetic powder deteriorates and, in turn, the playback output and S/N ratio cannot be sufficiently improved.

To improve the dispersibility of the fine magnetic powder in the magnetic layer mixture, it is proposed to use, as a dispersing agent, a saturated or unsaturated fatty acid having a hydrophilic group at one end and a lipophilic group at the other end (cf. Japanese Patent Publication Nos. 18221/1969 and 9488/1983). Such a fatty acid has weak bonding strength with the magnetic powder so that it cannot improve the dispersibility of the fine magnetic powder in the binding agent and thus the playback output and S/N ratio are not desirably improved. In addition, the magnetic layer containing the particularly fine magnetic powder tends to be damaged and its abrasion resistance deteriorates when slid against a magnetic head. Therefore, the abrasion resistance is improved by the addition of a filler with a Moh's hardness of at least 5 such as $Cr_2O_3$ and $Al_2O_3$. However, the dispersibility of such a filler is worse than that of the magnetic powder above and is difficult to be dispersed in the binding agent, so that the electromagnetic conversion characteristics are not sufficiently improved by the improvement of the surface flatness of the magnetic layer.

SUMMARY OF THE INVENTION

One object of the present invention is to provide a magnetic recording medium with good dispersibility of fine magnetic powder as well as non-magnetic fillers in a binding agent.

Another object of the present invention is to provide a magnetic recording medium with improved electrical properties such as electromagnetic conversion, and good abrasion resistance.

According to the present invention, there is provided a magnetic recording medium comprising a substrate and a magnetic layer coated thereon, the magnetic layer containing magnetic powder a resinous binding agent and at least one sorbic acid compound selected from the group consisting of sorbic acid and derivatives and metal salts thereof. The magnetic layer may further contain a non-magnetic filler with a Moh's hardness of at least 5.

DETAILED DESCRIPTION OF THE INVENTION

Sorbic acid to be used according to the present invention is an organic acid of the formula:

$$CH_3CH=CHCH=CHCOOH \qquad (I)$$

which has conjugated double bonds in the molecule, trans form with respect to both double bonds, and a comparatively small molecular weight. Sorbic acid adheres well to the surface of the magnetic powder and the non-magnetic filler powder and has a good affinity for the binding agent. Whe the magnetic layer mixture contains sorbic acid, the dispersibility of the magnetic powder and the non-magnetic filler in the binding agent is sufficiently improved so that the electromagnetic conversion characteristics of the magnetic recording medium are improved.

Specific examples of the derivatives of sorbic acid are esters (e.g. methyl, ethyl, propyl and butyl esters), amide, nitrile, anilide, phenylhydrazide, etc. These derivatives also have conjugated double bonds, trans form with respect to both double bonds and comparatively small molecular weights. They adhere well to the surface of the magnetic powder and the non-magnetic filler powder and have good affinity for the binding agent. Thus, they have substantially the same effects as sorbic acid when contained in the magnetic layer mixture.

The metal salt of sorbic acid is represented by the formula:

$$CH_3CH=CHCH=CHCOOM \qquad (II)$$

wherein M is a metal atom and has substantially the same properties and effects as sorbic acid and its derivatives when contained in the magnetic layer mixture. Specific examples of the metal salt of sorbic acid are salts with sodium, potassium, lithium, copper, magnesium, calcium, strontium, barium, zinc, cadmium, aluminium, tin, lead, titanium, zirconium, and so forth.

The sorbic acid compound may be used along or as mixtures thereof.

The sorbic acid compound may be directly added during preparation of the magnetic layer mixture containing the magnetic powder, the resinous binding agent and the optional non-magnetic filler, or it is dissolved in a suitable solvent (e.g. alcohols or ethers) and added to the magnetic layer mixture. Alternatively, the magnetic powder and optional non-magnetic filler are dispersed in the solution of the sorbic acid compound to adhere the latter to the surface of the former, and then the magnetic layer mixture is prepared by the use of the thus treated magnetic powder and the non-magnetic filler. The thus prepared magnetic layer mixture is applied on the surface of the substrate and dried to form the magnetic layer. Since the metal salt of sorbic acid is soluble in water, the surfaces of the magnetic powder and the non-magnetic filler are easily treated with an aqueous solution of the salt and it is possible to eliminate the disadvantages of using an organic solvent. In addition, since the magnetic powder or the non-magnetic filler is usually prepared in an aqueous medium, their surfaces can be treated with the sorbic acid compound without isolating the powder or the filler from the aqueus medium.

The amount of the sorbic acid compound in the magnetic layer is usually from 0.1 to 10% by weight, preferably from 0.1 to 5% by weight based on the weight of the magnetic powder in the layer. When the amount of the sorbic acid compound is less than 0.1% by weight, the objects of the invention are not achieved. When it is more than 10% by weight, the sorbic acid compound tends to bleed out.

In addition to the sorbic acid compound, the magnetic layer mixture may further contain other dispersing agents such as saturated or unsaturated fatty acids, phosphates, lecithin and metal soaps.

The magnetic powder utilized may be of any conventional kind, such as $\gamma$-$Fe_2O_3$ powder, $Fe_3O_4$ powder, an intermediate compound powder of $\gamma$-$Fe_2O_3$ powder and $Fe_3O_4$ powder, cobalt-containing $\gamma$-$Fe_2O_3$ powder, cobalt-containing $Fe_3O_4$ powder, $CrO_2$ powder, $\alpha$-Fe powder, Co powder, Fe-Ni powder, $Fe_4N$ powder, and barium ferrite powder. According to the present invention, the fine magnetic powder with a specific surface area of 30 $m^2/g$ or larger, measured by the BET method, can be used.

The resinous binding agent may be of any conventional kind, such as vinyl chloride/vinyl acetate/vinyl alcohol terpolymers, cellulose resins (e.g. nitrocellulose, etc.), butyral resins, polyurethane resins, polyester resins, epoxy resins, polyether resins, and isocyanate resins.

The organic solvent is selected from ketones (e.g. cyclohexanone, methyl ethyl ketone, methyl isobutyl ketone, etc.), esters (e.g. ethyl acetate, butyl acetate, etc.), ethers (e.g. tetrahydrofuran, dioxane, etc.) and aromatic hydrocarbons (e.g. benzene, toluene, xylene, etc.) and mixtures therof according to the kind of resinous binding agent to be dissolved.

The magnetic layer mixture may contain conventionally used additives such a lubricants, abrasives and antistatic agents.

On the back surface of the substrate, a back coating layer may be applied.

PREFERRED EMBODIMENTS

The present invention will be hereinafter explained further in detail by following Examples, wherein parts and % are by weight.

I. Production and Evaluation of Magnetic Sound Recording Tape
Example 1
Following components were dispersed in a ball mill for 72 hours:

| Component | Parts |
|---|---|
| $\gamma$-$Fe_2O_3$ powder[*1] | 800 |
| VAGH[*2] | 120 |
| Sorbic acid | 16 |
| Methyl isobutyl ketone | 410 |

-continued

I. Production and Evaluation of Magnetic Sound Recording Tape
Example 1
Following components were dispersed in a ball mill for 72 hours:

| Component | Parts |
|---|---|
| Toluene | 410 |

Note:
[*1] With specific surface area of 35 $m^2/g$ measured by the BET method.
[*2] A vinyl chloride/vinyl acetate/vinyl alcohol terpolymer manufactured by U.C.C. (USA).

To the thus prepared mixture, added was a mixture of 65 parts of Takelack E-551T (Trade name. A polyurethane resin manufactured by Takeda Chemical) and 15 parts of Colonate L (Trade name. A trifunctional low molecular weight isocyanate compound manufactured by Nippon Polyurethane Industries) to obtain a magnetic layer mixture. The mixture was applied on a polyester film of 11 microns in thickness, dried to give a magnetic layer of about 6 microns in thickness and calendered. The film was cut to form a magnetic sound recording tape with predetermined width.

EXAMPLE 2

$\gamma$-$Fe_2O_3$ powder (800 g), sorbic acid (20 g) and ethanol (500 ml) were dispersed in a homo mixer for 5 hours and dried to give $\gamma$-$Fe_2O_3$ powder the surface of which was coated with sorbic acid at an amount of 16 mg/g.

In the same manner as in Example 1 but using the thus prepared magnetic powder in place of non-coated magnetic powder and no sorbic acid, the magnetic sound recording tape was produced.

EXAMPLE 3

In the same manner as in Example 1 but using sorbic acid in an amount of 4 parts, the magnetic sound recording tape was produced.

EXAMPLE 4

In the same manner as in Example 1 but using sorbic acid in an amount of 40 parts, the magnetic sound recording tape was produced.

EXAMPLE 5

In the same manner as in Example 1 but using n-butyl sorbate in place of sorbic acid, the magnetic sound recording tape was produced.

EXAMPLE 6

In the same manner as in Example 1 but using sorbic acid in an amount of 8 parts and 8 parts of lauric acid, the magnetic sound recording tape was produced.

EXAMPLE 7

In the same manner as in Example 1 but using $Fe_3O_4$ powder in place of $\gamma$-$Fe_2O_3$ powder, the magnetic sound recording tape was produced.

EXAMPLE 8

In the same manner as in Example 1 but using cobalt-containing $\gamma$-$Fe_2O_3$ powder in place of $\gamma$-$Fe_2O_3$ powder, the magnetic sound recording tape was produced.

EXAMPLE 9

In the same manner as in Example 1 but using $\alpha$-Fe powder in place of $\gamma$-$Fe_2O_3$ powder and coating the magnetic layer of about 4 microns, the magnetic sound recording tape was produced.

COMPARATIVE EXAMPLE 1

In the same manner as in Example 1 but using no sorbic acid, the magnetic sound recording tape was produced.

COMPARATIVE EXAMPLE 2

In the same manner as in Example 1 but using lauric acid in place of sorbic acid, the magnetic sound recording tape was produced.

COMPARATIVE EXAMPLE 3

In the same manner as in Example 8 but using no sorbic acid, the magnetic sound recording tape was produced.

COMPARATIVE EXAMPLE 4

In the same manner as in Example 9 but using no sorbic acid, the magnetic sound recording tape was produced.

The magnetic sound recording tapes produced in Examples 1 to 9 and Comparative Examples 1 to 4 were examine for coersive force, residual magnetic flux density, squareness ratio and degree of orientation as magnetic properties and further for sensitivity (at 333 Hz, 7 KHz and 12.5 KHz) and maximum undistorted power output (MOL. 333 Hz) as electromagnetic conversion characteristics. The results are shown in Table 1, in which, depending on the characteristics of a playback equalizer due to the difference of coersive forces of the magnetic powder, the sensitivity and MOL in Examples 1 to 7 and Comparative Example 2 are represented as differences from those in Comparative Example 1 (0 dB), those in Example 8 are represented as differences from those in Comparative Example 3 (0 dB), and those in Example 9 are represented as difference from those in Comparative Example 4 (0 dB).

II. Production and Evaluation of Video Tape
Example 10
Following components were dispersed in a high speed agitator for 2 to 5 hours:

| Component | Parts |
| --- | --- |
| Co-containing $\gamma$-$Fe_2O_3$ powder (specific surface area of 35 $m^2$/g measured by the BET method) | 800 |
| Nitrocellulose (H½ type. 16% solution) | 56 |
| Carbon black (Average particle size of 23 milimicrons) | 4.5 |
| $\gamma$-$Fe_2O_3$ particles (Average particle size of 1.0 microns) | 5.0 |
| $Cr_2O_3$ (Average particle size of 1.0 microns) | 0.8 |
| $Al_2O_3$ (Average particle size of 0.4 microns) | 2.0 |
| Zinc stearate | 0.5 |
| Cyclohexanone | 90 |
| Toluene | 90 |

To the thus prepared mixture, added was sorbic acid (2.0 parts) followed by the addition of following components in a suitable order:

| Component | Parts |
| --- | --- |
| Polyurethane resin (20% solution) | 40 |
| Trifunctional low molecular weight isocyanate compound (75% solution) | 4 |
| n-Butyl stearate | 1 |
| Myristic acid | 2 |
| Cyclohexanone | 40 |
| Toluene | 40 |

The resultant mixture was mixed and dispersed with the high speed agitator and filtered through a 1 micron filter to prepare a magnetic layer mixture, which was applied on a polyester film of 13 microns in thickness, dried to give a magnetic layer of about 5 microns in

TABLE 1

| | Example No. | | | | | | | | | | | | |
| --- | --- | --- | --- | --- | --- | --- | --- | --- | --- | --- | --- | --- | --- |
| | 1 | 2 | 3 | 4 | 5 | 6 | Comp. 1 | Comp. 2 | 7 | 8 | Comp. 3 | 9 | Comp. 4 |
| Magnetic powder | $\gamma$-$Fe_2O_3$ | | | | | | | | | $Fe_3O_4$ | Co-containing $\gamma$-$Fe_2O_3$ | | $\alpha$-Fe |
| Thickness of magnetic layer ($\mu$) | 6.0 | 6.0 | 6.0 | 6.0 | 6.0 | 6.0 | 6.0 | 6.0 | 6.0 | 6.0 | 6.0 | 4.0 | 4.0 |
| Coercive force (Oe) | 320 | 320 | 320 | 320 | 320 | 320 | 320 | 320 | 320 | 650 | 650 | 1160 | 1160 |
| Residual flux density (G) | 1740 | 1735 | 1510 | 1745 | 1730 | 1650 | 970 | 1500 | 1737 | 1754 | 1018 | 3200 | 2700 |
| Squareness ratio Br/Bs | 0.86 | 0.86 | 0.85 | 0.86 | 0.86 | 0.85 | 0.78 | 0.84 | 0.85 | 0.86 | 0.76 | 0.81 | 0.76 |
| Degree of orientation | 2.6 | 2.6 | 2.5 | 2.6 | 2.6 | 2.6 | 1.9 | 2.4 | 2.6 | 2.6 | 1.7 | 1.8 | 1.2 |
| Sensitivity (dB) | | | | | | | | | | | | | |
| 333 Hz | +4.1 | +4.0 | +3.3 | +4.1 | +3.9 | +3.6 | 0 | +3.2 | +4.0 | +4.0 | 0 | +0.5 | 0 |
| 7 KHz | +4.5 | +4.4 | +3.8 | +4.5 | +4.3 | +4.0 | 0 | +3.7 | +4.5 | +4.5 | 0 | +1.0 | 0 |
| 12.5 KHz | +5.1 | +5.0 | +4.6 | +5.0 | +4.9 | +4.7 | 0 | +4.5 | +5.1 | +5.1 | 0 | +2.0 | 0 |
| Maximum undistorted power output (dB) | +7.3 | +7.1 | +5.7 | +7.3 | +7.0 | +6.2 | 0 | +5.5 | +7.3 | +7.2 | 0 | +5.2 | 0 | thickness and calendered. The film was cut to form a video tape with predetermined width.

EXAMPLE 11

In the same manner as in Example 10 but using sorbic acid in an amount of 0.5 part, the video tape was produced.

EXAMPLE 12

In the same manner as in Example 10 but using sorbic acid in an amount of 5.0 parts, the video tape was produced.

EXAMPLE 13

In the same manner as in Example 10 but using n-butyl sorbate in place of sorbic acid, the video tape was produced.

EXAMPLE 14

In the same manner as in Example 10 but using potassium sorbate in place of sorbic acid, the video tape was produced.

EXAMPLE 15

In the same manner as in Example 10 but using 50 parts of a vinyl chloride/vinyl acetate/vinyl alcohol terpolymer (20% solution) in place of nitrocellulose and 35 parts of polyurethane resin, the video tape was produced.

COMPARARTIVE EXAMPLE 5

In the same manner as in Example 10 but using no sorbic acid, the video tape was produced.

COMPARATIVE EXAMPLE 6

In the same manner as in Example 10 but using lauric acid in place of sorbic acid, the video tape was produced.

The video tapes produced in Examples 11 to 15 and Comparative Examples 5 and 6 were examined for surface roughness of the magnetic layer, RF outpt, chroma output, video S/N ratio, color S/N ratio, still characteristic and an amount of head abrased by following procedures:

Surface Roughness of Magnetic Layer

Average roughness (Ra) along the center line of the video tape is measured by means of a tracer type surface roughness meter.

RF Output

A VHS type video tape recorder is used. A video signal with 50% white is recorded on the video tape and playbacked. An FF modulation playback signal is measured by means of an oscilloscope and compared with that of a standard video tape.

Chroma Output

A VHS type video tape recorder is used. A homochromatic signal is recorded on the video tape and playbacked. A level of a playback signal of a converted chromatic signal at a low level is measured by means of an oscilloscope and compared with that of a standard video tape.

Video S/N Ratio

A VHS type video tape recorder is used. A video signal with 50% white is recorded on the video tape and playbacked. Noise in a playbacked signal is measured by means of a video noise measuring device and compared with that of a standard video tape.

Color S/N Ratio

A VHS type video tape recorder is used. A homochromatic signal is recorded on the video tape and playbacked. AM noise in a playbacked signal is measured by means of a video noise measuring device and compared with that of a standard video tape.

Still Characteristics

A VHS type video tape recorder is used. A video tape is playbacked in a still mode and a time in which a level of playbacked output is decreased by 5 dB from the initial level is measured

Amount of Head Abrased

A video tape is travelled 100 times by means of a VHS type tape recorder at 40° C., 80%RH. Then, an amount of head abrased is weighed.

The results are shown in Table 2.

TABLE 2

| Example No. | Surface roughness of magnetic layer (82) | RF output (dB) | Chroma output (dB) | Video S/N ratio (dB) | Color S/N ratio (dB) | Still characteristic (hour) | Amount of head abrased (82) |
| --- | --- | --- | --- | --- | --- | --- | --- |
| 10 | 0.004 | +0.2 | +1.7 | +3.2 | +5.2 | >2.0 | 0.3 |
| 11 | 0.005 | 0 | +1.5 | +3.1 | +5.0 | >2.0 | 0.3 |
| 12 | 0.004 | +0.3 | +1.8 | +3.3 | +5.2 | >2.0 | 0.3 |
| 13 | 0.005 | 0 | +1.5 | +3.1 | +5.0 | >2.0 | 0.3 |
| 14 | 0.004 | +0.1 | +1.5 | +3.3 | +5.2 | >2.0 | 0.3 |
| 15 | 0.007 | 0 | +0.5 | +2.5 | +3.8 | 1.0 | 0.5 |
| Comp.5 | 0.010 | −1.2 | −0.5 | +0.5 | +1.3 | 1.0 | 0.8 |
| Comp.6 | 0.009 | −1.0 | −0.2 | +0.7 | +2.5 | 1.5 | 0.4 |

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A magnetic recording medium comprising a substrate and a magnetic layer coated thereon, said magnetic layer containing a metal oxide magnetic powder having a specific surface area of at least 30 m$^2$/g measured by the BET method, a resinous binding agent and a dispersing agent consisting essentially of at least one sorbic acid compound selected from the group consisting of sorbic acid and derivatives and metal salts thereof for the purpose of increasing the affinity of said magnetic powder for said binding agent said sorbic acid compound being present in an amount of from 0.1 to 10% by weight based on the weight of the magnetic powder.

2. A magnetic recording medium according to claim 1, which further comprises a non-magnetic filler with a Moh's hardness of at least 5.

3. A magnetic recording medium according to claim 1, wherein said sorbic acid compound is adhered to the surfce of said magnetic powder.

4. A magnetic recording medium according to claim 2, wherein said sorbic acid compound is adhered to the surface of said non-magnetic filler.

5. A magnetic recording medium according to claim 2, wherein said non-magnetic filler is selected from at least one member of the group consisting of $Cr_2O_3$ and $Al_2O_3$.

6. A magnetic recording medium according to claim 1, wherein said resinous binding agent is selected from at least one member of the group consisting of vinyl chloride/vinyl acetate/vinyl alcohol terpolymers, nitrocellulose and polyurethane/resins.

7. The magnetic recording medium of claim 1 wherein said metal oxide magnetic powder is selected from at least one member of the group consisting of $\gamma$-$Fe_2O_3$ powder, $Fe_3O_4$ powder, an intermediate compound powder of $\gamma$-$Fe_2O_3$ powder and $Fe_3O_4$ powder, cobalt-containing $\gamma$-$Fe_2O_3$ powder, cobalt-containing $Fe_3O_4$ powder, $CrO_2$ powder and barium ferrite powder.

8. A magnetic recording medium according to claim 1, wherein said sorbic acid compound is preslent in an amount of from 0.1 to 5% by weight based on the weight of the magnetic powder.

9. A magnetic recording medium according to claim 1, wherein said sorbic acid compound is sorbic acid.

10. A magnetic recording medium according to claim 1, wherein said sorbic acid compound is a sorbic acid derivative selected from at least one member of the group consisting of methyl ester, ethyl ester, propyl ester, butyl ester, amide, nitrile, anilide, and phenylhydrazide of sorbic acid.

11. A magnetic recording medium according to claim 10, wherein said sorbic acid derivative is n-butyl sorbate.

12. A magnetic recording medium according to claim 1, wherein said sorbic acid compound is a metal salt of sorbic acid selected from at least one member of the group consisting of sodium salt, potassium salt, lithium salt, copper salt, magnesium salt, calcium salt, strontium salt, barium salt, zinc salt, cadmium salt, aluminium salt, tin salt, lead salt, titanium salt and zirconium salt of sorbic acid.

13. A magnetic recording medium according to claim 12, wherein said metal salt of sorbic acid is potassium sorbate.

* * * * *